May 5, 1942.  V. E. WHITMAN  2,282,291
PHOTOGRAPHIC CAMERA SHUTTER CONTROL MEANS
Filed Nov. 8, 1940  2 Sheets-Sheet 1
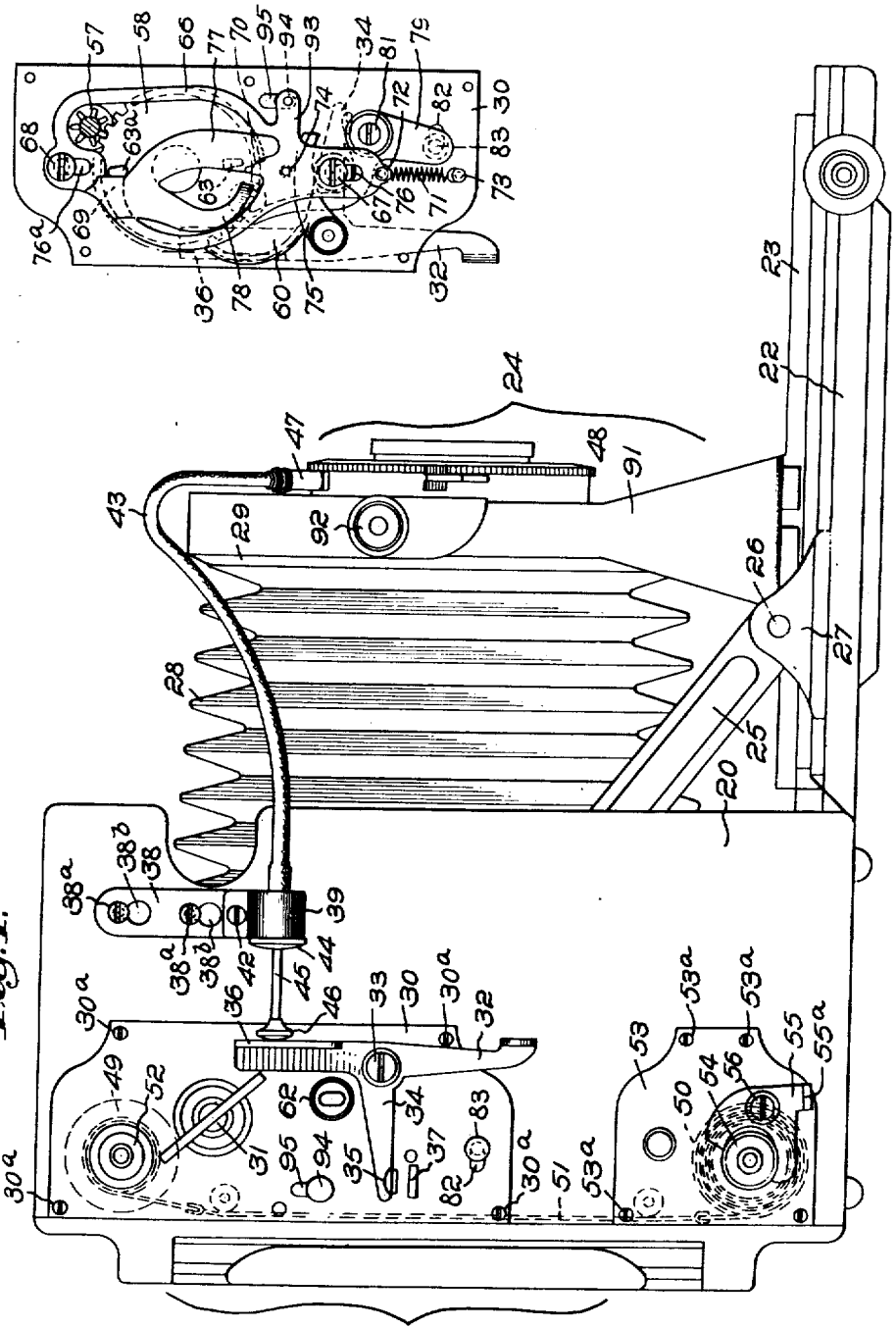
INVENTOR.
Vernon E. Whitman,
BY
Emery, Booth, Townsend, Miller and Loveland
Attys.

May 5, 1942.  V. E. WHITMAN  2,282,291
PHOTOGRAPHIC CAMERA SHUTTER CONTROL MEANS
Filed Nov. 8, 1940  2 Sheets-Sheet 2
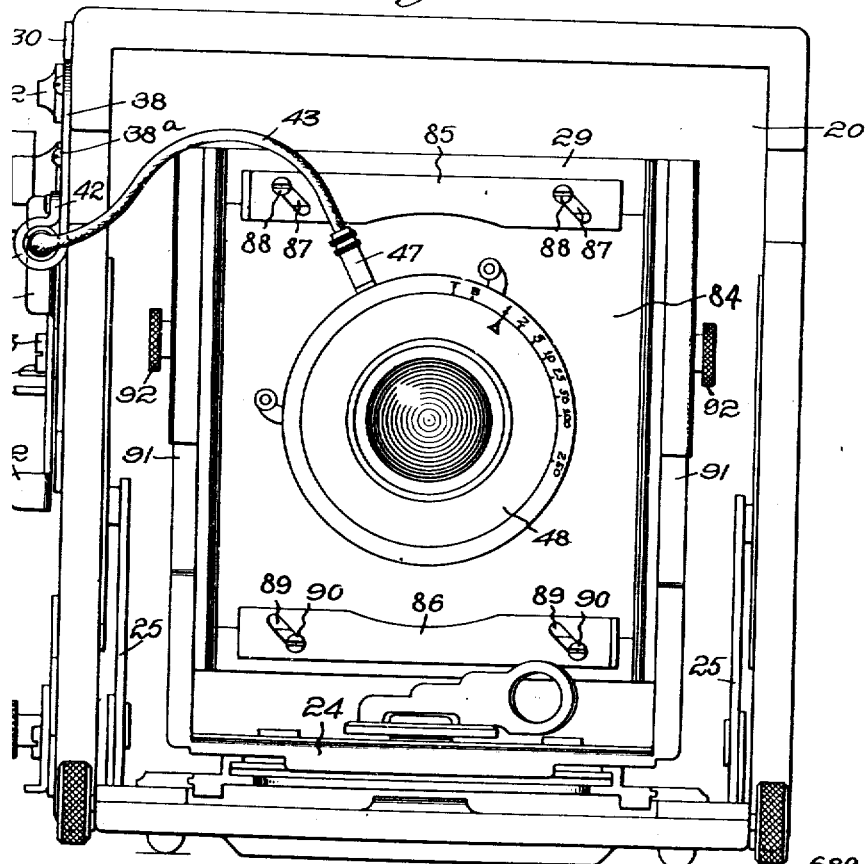
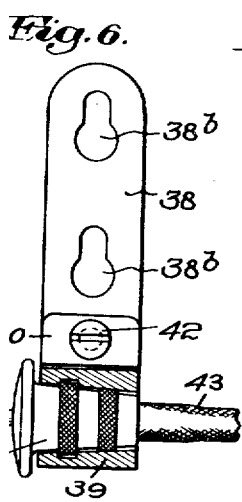
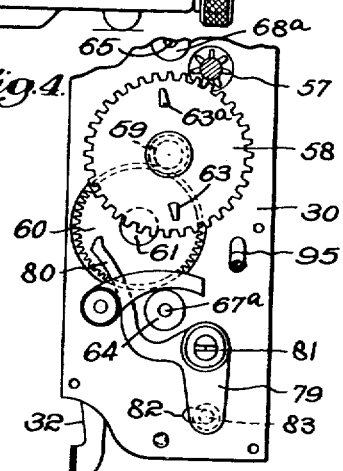
INVENTOR.
Vernon E. Whitman.

Patented May 5, 1942

2,282,291

UNITED STATES PATENT OFFICE 2,282,291

PHOTOGRAPHIC CAMERA SHUTTER CONTROL MEANS

Vernon E. Whitman, Rochester, N. Y., assignor to The Folmer Graflex Corporation, Rochester, N. Y., a corporation of Delaware Application November 8, 1940, Serial No. 364,876

22 Claims. (Cl. 95—53)

[is] invention relates to shutter control means [p]hotographic cameras.

[In] order that the principle of the invention [may] be readily understood, I have disclosed a [typical] embodiment thereof in the accompanying [drawi]ngs, wherein—

[Fig.] 1 is a side elevation of a photographic [camer]a showing the application of my invention [theret]o;

[Fig.] 2 is a rear view of the back shutter operating mechanism;

[Fig.] 3 is a front elevation of the structure [shown] in Fig. 1;

[Fig.] 4 is a view similar to Fig. 2, some of the [parts] having been removed to show more clearly [the co]nstruction of the shutter operating mechanism;

[Fig.] 5 is an isometric detail of the cable release [clampi]ng means; and

[Fig.] 6 is a front elevation of Fig. 5, but partly [in sect]ion, showing the cable release clamped in [positio]n.

[My] invention relates to shutter control [means and] it may, as herein disclosed, be readily [applied] to any camera having a front and a back [shutter]. I have chosen, without so limiting its [scope, to] show it on a camera such as disclosed [in the] co-pending application of Oscar Steiner, [Ser. No]. 309,385, filed December 15, 1939, being [a came]ra of the well-known Speed Graphic type [having] a focal plane shutter, herein referred to [as the] back shutter, and a between-the-lens [shutter,] preferably of the Compur type, herein [referred] to as the front shutter.

[Most] of these cameras today are equipped with [both fro]nt and back shutters, but heretofore so [far as I] am aware these have always been operated [as] separate units, by which I mean that [when th]e back shutter was used for making the [exposur]e, the front shutter would of necessity [have to] be set in an open condition, and when [the fron]t shutter was used for making the exposure, [the back shutter would also have to be [set in a]n open condition. This required considerable [c]are and attention upon the part of the [operator], in spite of which mistakes were not [infreque]ntly made because one of the shutters [was not] properly set. By the present invention [I have p]rovided means completely eliminating [this diffi]culty.

[Among] the important objects of this invention [are: to p]rovide a camera with front and back [shutters] that can be operated simultaneously; [to provi]de a front and a back shutter of which [the front] shutter can be locked in open condition and the front shutter operated only from the back shutter release; to provide a camera having a front and a back shutter of which the front shutter can be used as a capping means for the back shutter; and to provide means for attaching the cable release of the front shutter in position to be operated by the back shutter release.

Referring first to Figs. 1 and 3, the camera box which, excepting as hereinafter specified, may be of any suitable elements, is indicated generally at 20, the camera back at 21 and the camera bed or cover at 22, the latter being attached to the camera box by the usual hinge and provided with an overlying bed portion 23, said parts being adapted to be opened and turned down into a horizontal position, as indicated in Fig. 1. The said overlying bed portion 23 has attached thereto a camera front member 24 and said bed and bed portion are held in open position by means of side arms 25 attached to the camera bed portion 22 by means of rivets 26 and bed extending members 27, one at each side of the bed. The bed is adapted, with the bed portion 23, to be folded up into vertical or upright position where it acts as a door or cover.

The camera is provided with the usual bellows indicated at 28, the inner end thereof being attached to the camera box 20 and the outer end to the camera front frame 29. The camera is provided with a suitable focal plane shutter and, as herein shown, is provided with the well known Graflex type of focal plane shutter having a shutter plate 30 secured to the side of the camera box 20 by screws 30a, 30a. The camera is provided with a winding knob 31 and a shutter release lever 32 pivotally mounted upon said shutter plate 30 by means of a shoulder screw 33. The release lever 32 has a laterally extending arm 34 having a bent-over, somewhat cup shaped formation 35 and a second but vertically extending arm 36. Attached to the said shutter plate 30 is a threaded boss 37 into which can be threaded the usual cable release for operating the shutter mechanism through cooperation with the arm 34 of the release lever 32.

Attached, preferably detachably, to the camera box 20 is a bracket 38, shown enlarged in Figs. 5 and 6, it being held in position by screws 38a, 38a extending through buttonhole-shaped openings 38b, 38b in said bracket 38. The described structure provides means for readily detaching the cable release supporting bracket 38 from the camera box. The said bracket 38 has at its lower end a preferably cylindrical formation or one end of which is provided with a lip g a hole 41 through which passes a screw ded into a hole (not shown) in the said 38. The described structure provides or clamping or supporting in position the lease shown at 43, and which is desirably of the usual fabric-covered tubing to attached an enlarged end member 44 he usual operating pin 45 with a head 46. opposite end of the cable release 43 is a ferrule 47 threaded into the front shut- The said cable release, being well known art, does not require further description. ocal plane shutter, in the disclosed em- it of the application of my invention, but h my invention is not limited, consists of up curtain roller 49 and a curtain tension 0, both shown in dotted lines in Fig. 1. g upon the said rollers 49 and 50 is a mul- erture curtain 51 having a series of open- differing size, any one of which can be for making the exposure. In addition various openings for making the so-called aneous exposures, one large opening is bly provided to be used for time exposures e used when the focal plane shutter is in called open condition, represented in Fig. 1. rring more particularly to Fig. 1, the take- tain roller 49 is provided with a suitable 52 attached to the said shutter plate 30 also provided with a bearing on the oppo- e of the camera box, but not shown. The tension roller 50 is provided with a ten- ate 53 secured to the camera box 30 by 53a, 53a, and is also provided with a ten- nob 54 for the purpose of adjusting the of the curtain roller 50. Attached to the 54 is a single ratchet tooth or cam (not ) engaged by an escapement 55 which is ed to the said tension plate 53 by a shoul- rew 56. The function of the said escape- 55 is that of allowing tension to be relieved the curtain tension roller 50 through an ting movement of said escapement 55 im- by handle 55a. Said escapement 55 also its the knob 54 from turning backward said knob is being adjusted to a predeter- tension. On the opposite side of the cam- x 20 is provided a second bearing for sup- g the opposite end of the curtain tension 50. This part of the structure is well and has been used upon Graflex cameras any years, and hence needs no further de- ion. erring more particularly to Fig. 2, the cur- oller 49 has attached thereto a pinion 57 ng with a large gear 58 pivoted on the ng knob 31. Attached to the said gear is ion 59, shown in dotted lines in Fig. 4, and ing with a second gear 60 mounted upon utter plate 30 by means of a shoulder rivet The function of the gear 60 is to provide s indicating the position of the curtain roll- with respect to the various curtain aperture ngs. The opposite face of the gear 60 from shown in Fig. 4 is provided with a series aracters, preferably numerals circularly ar- d indicating such curtain aperture openings. the largest curtain aperture opening is e the focal plane, "0" appears in the open- 62, as indicated in Fig. 1. Inasmuch as the ing knob 31 is attached directly to the gear ny turning movement of said knob will cause e movement of gear 58, and since gear 58 es with the pinion 57, the curtain roller 49 will be caused to move in such direction as to wind up the curtain 51 on the curtain roller 49, when the winding knob 31 is turned in a contraclockwise direction, viewing Fig. 1.

When the said winding knob 31 is turned 180 degrees, the shutter or curtain 51 will be wound a sufficient distance on the roller 49 to bring a new aperture into position for the next exposure, and this fact will be indicated at the opening 62 of the shutter plate 30.

To make an exposure, the gear 58 must be permitted to make one half a complete revolution (i. e. 180 degrees). For this purpose the following means is provided in this representation of the application of my invention, to which, however, my invention is not limited.

Attached to the said gear 58 are dogs 63, 63a, shown in Figs. 2 and 5, and to the shutter plate 30 is attached a so-called ratchet plate 66 by means of shoulder screws 67, 68, as best shown in Fig. 2. The said ratchet plate 66 is provided with detents 69, 70, shown in dotted lines in Fig. 2 as so located as to permit at due time one half a complete revolution of the gear 58. The ratchet plate 66 is caused to be moved downwardly by a coiled spring 71 attached to a pin 72 on the ratchet plate 66, and to a pin 73 attached to the shutter plate 30. An operating pin 74, shown in dotted lines in Fig. 2, is riveted or otherwise secured to the ratchet plate 66 and is engaged by an operating lever 75 having a short or stud shaft passing through a hole in the shutter plate 30, being secured in turn to the shutter release lever 32 by means of the screw 33, shown in Fig. 1.

When the shutter release lever 32 is moved in a contraclockwise direction (that is, to the right viewing Fig. 2), the ratchet plate 66 will be moved upward under the influence of lever 75 and the pin 74 within the limits of the slots 76, 76a of the ratchet plate 66. When the latter is moved upwardly, the detent 69 will disengage the dog 63a of the gear 58, allowing said gear to turn in a contraclockwise direction, viewing Fig. 2, until the dog 63a is stopped by detent 70. The hand pressure of the operator is then released from the shutter release lever 32, allowing the ratchet plate 66 to move downward to the position shown in Fig. 2 under the influence of spring 71, thus removing the detent 70 from contact with the dog 63a and allowing the gear 58 to make a further slight movement of rotation until the second dog 63 is engaged by the detent 69.

During the operation just described, the shutter or curtain 51 has traveled a sufficient distance to allow one aperture thereof to pass the focal plane of the camera. In order to prevent the gear 58 from bouncing or oscillating when the dog 63, or the dog 63a, is stopped by the detent 70, a spring member 77 is provided with an end or finger 78 to engage the free face of the dog 63 or the dog 63a when stopped by the detent 70.

While the mechanism just described is well known in the art, I have incorporated therein or applied thereto in accordance with and to accomplish the purposes of my invention, means for locking the said gear 58 so that when the shutter release lever 32 is used to operate the cable release 43, it operates only the front shutter 48, thereby maintaining the curtain 51 in open condition, with the largest opening before the focal plane of the shutter. I will now proceed to describe the preferred embodiment of the means for carrying out this feature of my invention.

Referring more particularly to Figs. 2 and 4, there is attached to the shutter plate 30 a somewhat S-shaped lever 79 having an upwardly extending finger 80. The said lever 79 is pivotally mounted upon the shutter plate 30 by means of a shoulder screw 81, and the said plate has an elongated transversely extending opening 82 through which passes an operating button 83. When said button is moved to the left viewing Fig. 4, the lever finger 80 is swung to the right viewing said figure until one of the teeth of the gear 58 is engaged by the pointed end of the said lever finger 80, which thus acts as a pawl and prevents the shutter gear 58 from turning in a contraclockwise direction, as would be necessary were the shutter operated to make an exposure. As soon as the operator turns the shutter winding knob 31 in a contraclockwise direction, viewing Fig. 1, the said gear 58 is caused to turn in a clockwise direction viewing Figs. 2 and 4, thus disengaging the finger 80 of the lever 79 from the teeth of the gear 58. The shutter can then be wound to any desired aperture.

By the mechanism just described the camera can be set with the large aperture of the curtain 51 in a position to permit time exposure or an exposure through the front shutter, and can be locked in place by means of the knob 83. If the operator then decides to use one of the other exposure apertures of the curtain 51 for making instantaneous exposures, the mere act of winding the said curtain to the selected aperture thereof will disengage the locking means just described.

In Fig. 3 is shown a structure well known in the art for mounting the front shutter 48. The latter is attached to a lens board 84 held to the camera front board or frame 29 by the usual slide locks 85, 86. The slide lock 85 is provided with two inclined slots 87, 87 through which pass screws 88, 88 threaded into the front board or frame 29, thus holding said slide lock 85 in place. The other slide lock 86 is provided with two inclined slots 89, 89 through which pass screws 90, 90 threaded into the camera front board or frame 29, thus holding the lower slide lock 86 in place. The camera front board or frame 29 is carried by side arms 91, 91 of the camera front 24 and is held in position by clamping nuts 92, 92.

I have described the manner of operating the rear or focal plane shutter or curtain and the means employed by me for locking such focal plane shutter or curtain in open condition in the practice of my invention. It is, in addition, highly desirable to operate the front shutter from the focal plane shutter or curtain operating lever. In accordance with my invention, I have provided means for accomplishing this while operating the focal plane shutter or curtain at the same time, and I will now describe the selected embodiment of such means.

To the front shutter 48 is attached the usual cable release 43 already described. If the back shutter or curtain 51 be wound until the character "0" appears in the window 62, as indicated in Fig. 1, and the knob 83 of the back shutter or curtain locking means be moved to the left viewing Fig. 1, the back shutter or curtain is locked. Exposures are then made by operating the shutter release lever 32 which actuates the front shutter through the shutter cable release 43 in the usual manner. However, the procedure, when making exposures with the back or focal plane shutter or curtain, is to set the front shutter on "Time," then to open the front shutter, then to put the dark slide into the plate holder and then to wind the rear shutter or curtain into the selected position. It is necessary to put the dark slide in the holder because when the back shutter or curtain 51 is rewound, the shutter aperture thereof passes the exposure opening, and this would otherwise cause the sensitized material to be exposed, ruining the plate or film that is in position.

In the practice of my invention and in carrying out the function thereof, the front shutter is set on bulb position. Inasmuch as the front shutter is normally closed, the back shutter or curtain may be wound to position even though the dark slide has been removed from the plate or film holder. When it is desired to make an exposure, pressure on the shutter release lever 32 will cause the front shutter to be opened because of the arm 36 thereof pushing the shutter operating button 46 of the cable release 43. The mechanism shown is so adjusted that the front shutter is opened before the back shutter or curtain is released. When pressure is applied by the operator to the shutter release lever 32, the ratchet plate 66 is moved upwardly until the detent 69 releases the dog 63a, thus allowing the back shutter or curtain 51 to run down in the manner previously described. The said back shutter or curtain may now be rewound for a second exposure without inserting the dark slide or otherwise making adjustments, since the front shutter is in closed position.

It may be desirable under certain conditions to allow the back shutter or curtain 51 to be run down in order to select an aperture thereof that has already been wound up onto the curtain roller 49, without, however, at the same time making an exposure through an aperture of that shutter or curtain.

In order to accomplish this result, I have, as the preferred embodiment of means for the purpose, provided, as shown in Fig. 2, a long finger 93 integral with and laterally extending from the ratchet plate 66. The said finger 93 is provided with a button 94 having a reduced diameter portion passing through a vertical slot 95 in the shutter plate 30. The said button 94 is free to move in a vertical direction because of said slot 95, and when moved in an upward direction and then released, the shutter winding gear 58 is thereby permitted to make one-half a revolution, thus permitting the back shutter or curtain 51 to be moved a sufficient distance to bring a second aperture thereof into position ready for an exposure.

Thus I have provided means for changing the position of the shutter or curtain 51 to permit the selection of any aperture within the range of such shutter or curtain, without exposing the sensitized material in the plate or film holder.

It will be evident from the foregoing disclosure and explanation of my invention that I have provided a camera having both a between-the-lens shutter and a focal plane shutter, preferably of the curtain type, capable of being operated either independently or simultaneously from a single operating lever or other suitable means. My invention as herein disclosed provides means for using the between-the-lens shutter as a capping means for the focal plane shutter with the result that there is provided a rugged self-capping focal plane shutter of simple construction that does not have any of the faults common to the usual self-capping focal plane shutters. My invention enables the operator to select in each instance the shutter of the camera that is best suited for the particular picture that s to be taken, and such selected shutter will be operated from the single operating means herein disclosed, thereby eliminating those errors that are so liable to occur with cameras equipped with two shutters.

Having thus described one illustrative embodiment of the invention, it is to be understood that although specific terms are employed, they are used in a generic and descriptive sense, and not for purposes of limitation, the scope of the invention being set forth in the following claims.

I claim:

1. In a photographic camera having a between-the-lens shutter and a back shutter, shutter control means therefore, including manually manipulable release means for the back shutter, and also including manually manipulable cable-release operating means for the between-the-lens shutter, and means effecting substantially simultaneous operation of both said shutters by manipulation of said release means for the back shutter, said means for effecting substantially simultaneous operation of both said shutters including means on the camera for supporting and presenting for actuation said cable release means in such position in proximity to said manually manipulable release means that operating movement of said latter means actuates said cable release means, and therefore said between-the-lens shutter.

2. A photographic camera according to claim 1, wherein the means for effecting substantially simultaneous operation is constructed to permit at the option of the operator, the independent operation of either of said shutters.

3. In a photographic camera having a between-the-lens front shutter and a curtain focal-plane shutter with a plurality of different sized openings, a cable release for such front shutter, release means for said curtain focal-plane shutter, and means for supporting said cable release means in position for operation by said release means, so that by operation of said release means the cable release is thereby actuated to operate said front shutter.

4. In a photographic camera having a between-the-lens front shutter and a curtain focal-plane shutter with a plurality of different sized openigs, cable release means operatively associated with the front shutter for operating the same, means for supporting said cable release means in position for operation by said release means, and means for operating said cable release by the usual release means of the curtain focal plane shutter.

5. In a photographic camera having a between-the-lens front shutter and a curtain focal-plane shutter with a plurality of different sized openings, a cable release for the front shutter having an operating plunger adapted for manual application of pressure, said focal-plane shutter having a release lever, and means to support said cable release on the camera in such position that said plunger thereof is operated by manipulation of the back shutter release lever.

6. In a photographic camera having a between-the-lens front shutter and a curtain focal-plane shutter with a plurality of different sized openings, said front shutter having an operating plunger of a cable release adapted for manual application of pressure, a release lever for said curtain focal-plane shutter, means to support said cable release for operation by said release lever, the latter having a portion against which the said plunger of the cable release is supported in such position that operating manipulation of the shutter release lever actuates said cable release plunger.

7. In a photographic camera having a between-the-lens front shutter and a curtain focal-plane shutter with a plurality of different sized openings, a cable release for said front shutter, release means for said curtain focal-plane shutter, and bracket means mounted on the camera for supporting the cable release in such operative relation to the said focal plane curtain shutter release means that operating manipulation of said release means actuates said cable release.

8. In a photographic camera having a between-the-lens front shutter and cable release means operatively associated with said shutter for operating the same, a curtain focal-plane shutter with a plurality of different sized openings, a shutter release member for said focal plane shutter and actable upon said cable release means, escapement means for said curtain focal-plane shutter, and means to lock the said escapement means against release by normal operation of said shutter release member.

9. In a photographic camera having a front shutter and a back shutter, manually manipulable release means for the back shutter, manually manipulable operating means for the front shutter, means whereby the front shutter may be operated through its operating means by manipulation of the said release means for the back shutter, and means for locking said back shutter against release through normal operation of said release means, whereby upon manipulation of said release means the front shutter is operated while the back shutter remains locked.

10. In a photographic camera having a front shutter and a back shutter, manually manipulable release means for the back shutter, manually manipulable operating means for the front shutter, means whereby the front shutter may be operated through its operating means by manipulation of the said release means for the back shutter, and manually manipulable locking means to prevent operation of the back shutter through the normal operation of said release means, whereby the front shutter alone is operated upon manipulation of said release means while said locking means is in its functioning position, and therefore prevents operation of said back shutter by said release means.

11. In a photographic camera having a front shutter and a back shutter, manually manipulable release means for the back shutter, manually manipulable operating means for the front shutter, means whereby the front shutter may be operated through its operating means by manipulation of the said release means for the back shutter, escapement means for said back shutter, and locking means for said escapement means, whereby the back shutter may be locked from operation through the normal operation of said release means and therefore the front shutter only is operated through manipulation of the release means for the back shutter.

12. In a photographic camera having a between-the-lens front shutter and a focal plane curtain shutter having a plurality of different sized openings, an escapement for said focal plane shutter, cable release means for the between-the-lens shutter, release means for said focal plane curtain shutter, so positioned with respect to the cable release as to actuate the same by manipulation of said release means, means to support said cable release means in position for such actuation, and locking means for said escapement against release by normal operation of said release means.

13. In a photographic camera having a between-the-lens front shutter and a focal plane curtain shutter having a plurality of different sized openings, an escapement for said focal plane shutter, cable release means for the between-the-lens shutter, release means for said focal plane curtain shutter, so positioned with respect to the cable release as to actuate the same by manipulation of said release means, means to support said cable release means in position for such actuation, and manually controlled locking means for said escapement against release by normal operation of said release means, whereby, when said locking means is in functioning position, manipulation of the said release means for the focal plane shutter operates only the between-the-lens shutter.

14. In a photographic camera having a between-the-lens front shutter and a focal plane curtain shutter having a plurality of different sized openings, an escapement for said focal plane shutter, cable release means for the between-the-lens shutter, and release means for said focal plane curtain shutter, so related to said cable release means that the said front shutter may be acted upon thereby to act as capping means for the back shutter, and means to support said cable release means in position to be actuated by said release means.

15. In a photographic camera having a front shutter and a back shutter, manually manipulable release means for the back shutter, manually manipulable operating means for the front shutter, operating connections between said front shutter and said back shutter including means whereby the front shutter is operated through its operating means by manipulation of the said release means for the back shutter, escapement means for said back shutter including a rotatable gear 58 and locking means manually movable into position to engage teeth of said gear to prevent operation of said escapement through the normal operation of said release means.

16. In a photographic camera having a front shutter and a focal-plane curtain shutter, manually manipulable release means for said curtain shutter, manually manipulable operating means for the front shutter, operating connections between said front shutter and said back shutter including means whereby the front shutter is operated through its operating means by manipulation of the said release means for the back shutter, escapement means for said curtain shutter, and manually operable means engageable with said escapement means to effect sufficient operation of said escapement means to bring an already wound-up aperture of the curtain back into exposure position.

17. In a photographic camera having a front shutter and a focal-plane curtain shutter, manually manipulable release means for said curtain shutter, manually manipulable operating means for the front shutter, operating connections between said front shutter and said back shutter including means whereby the front shutter is operated through its operating means by manipulation of the said release means for the back shutter, escapement means for said curtain shutter, and means to effect the partial running down of the curtain shutter for the selection of an aperture thereof already wound up on the curtain roller, said means including a part movable with the escapement means and manually manipulable means to engage the same.

18. In a photographic camera having a front shutter and a focal-plane curtain shutter, manually manipulable release means for said curtain shutter, manually manipulable operating means for the front shutter, operating connections between said front shutter and said back shutter including means whereby the front shutter is operated through its operating means by manipulation of the said release means for the back shutter, escapement means for said curtain shutter including a ratchet plate, and means to effect the partial running down of the curtain shutter for the selection of an aperture thereof already wound up on the curtain roller, said means including said ratchet plate of the said escapement means, and including a finger extending from said ratchet plate, and means whereby said finger may be manually manipulated.

19. In a photographic camera having a front shutter and a focal-plane curtain shutter, manually manipulable release means for said curtain shutter, manually manipulable operating means for the front shutter, operating connections between said front shutter and said back shutter including means whereby the front shutter is operated through its operating means by manipulation of the said release means for the back shutter, escapement means for said curtain shutter, and curtain-manipulating, exposure-preventing means for changing the position of the curtain shutter, thereby to select any aperture thereof within the range of the shutter curtain without thereby exposing the positioned sensitized material.

20. In a photographic camera having a between-the-lens shutter and a back shutter, shutter control means therefor, including manually manipulable release means for the back shutter, and also including manually manipulable operating means for the between-the-lens shutter, and means effecting substantially simultaneous operation of both of said shutters by manipulation of said release means for the back shutter, said means for effecting such substantially simultaneous operation, acting through said operating means for the between-the-lens shutter to operate the latter, said means for effecting such operation of both said shutters being supported in a readily applied manner entirely outside the casing of the said camera, and so that said manually manipulable operating means for the between-the-lens shutter is operated by the release means for the back shutter, and also so that when removed each of said shutters is adapted to be independently operated.

21. In a photographic camera having a between-the-lens shutter and a back shutter, shutter control means therefor, including manually manipulable release means for the back shutter, and also including cable release means for the between-the-lens shutter, and means for effecting substantially simultaneous operation of both said shutters by manipulation of said release means for the back shutter, said means for effecting such substantially simultaneous operation acting through said cable release means for the between-the-lens shutter to operate the latter, said means for effecting such operation of both said shutters being supported in a readily applied manner entirely outside the casing of the said camera so that the plunger thereof is operated by manipulation of said release means for the back shutter, and so that when removed each of said shutters is adapted to be independently operated.

22. In a photographic camera having a between-the-lens shutter and a back shutter, shutter control means therefor, including manually manipulable release means for the back shutter, and also including cable release means for the between-the-lens shutter, and means for effecting substantially simultaneous operation of both said shutters by manipulation of said release means for the back shutter, said means for effecting such substantially simultaneous operation acting through said cable release means for the between-the-lens shutter to operate the latter, the said cable release means being so supported upon the camera casing that the plunger thereof is operated by manipulation of said release means for the back shutter, and so that it can be readily removed entirely from the camera, thereby leaving the said back shutter operable in usual manner by said release means, and said between-the-lens shutter operable without said cable release means.

VERNON E. WHITMAN.